United States Patent [19]

Mautz et al.

[11] 4,183,718
[45] Jan. 15, 1980

[54] ROTOR FOR A ROTARY WING AIRCRAFT

[75] Inventors: Karlheinz Mautz, Ottobrunn; Emil Weiland, Hohenbrunn; Alois Schwarz, Ottobrunn, all of Fed. Rep. of Germany

[73] Assignee: Messerschmitt-Bölkow-Blohm GmbH, Munich, Fed. Rep. of Germany

[21] Appl. No.: 855,668

[22] Filed: Nov. 29, 1977

[30] Foreign Application Priority Data

Dec. 11, 1976 [DE] Fed. Rep. of Germany ....... 2656296

[51] Int. Cl.² ............................................. B64C 27/48
[52] U.S. Cl. .................................. 416/134 A; 416/138
[58] Field of Search ............... 416/134 A, 138 A, 136, 416/141

[56] References Cited

U.S. PATENT DOCUMENTS

| 3,470,962 | 10/1969 | Cure | 416/134 A |
|---|---|---|---|
| 3,504,989 | 4/1970 | Kisovec | 416/135 |
| 3,578,877 | 5/1971 | Mautz | 416/134 A |
| 3,610,774 | 10/1971 | Mouille | 416/138 A X |
| 3,824,037 | 7/1974 | Mautz et al. | 416/136 |
| 4,008,980 | 2/1977 | Noehren et al. | 416/134 A |

FOREIGN PATENT DOCUMENTS

| 642206 | 7/1962 | Italy | 416/102 |
|---|---|---|---|
| 1190259 | 4/1970 | United Kingdom | 416/134 A |

*Primary Examiner*—Everette A. Powell, Jr.
*Attorney, Agent, or Firm*—Toren, McGeady and Stanger

[57] ABSTRACT

A rotor for a rotary wing aircraft includes a rotor head and an even number of rotor blades arranged in pairs about the rotor head. The rotor blades of each pair are located diametrically opposite each other and each blade has a root end positioned radially inwardly toward the head. Bearings carried by the rotor head pivotally support each of the rotor blades. A torsionally elastic connection member extends between and connects the roots of a pair of rotor blades, and the connection member is mounted at its longitudinal center in the rotor head for pivotal movement about its longitudinal axis.

4 Claims, 4 Drawing Figures

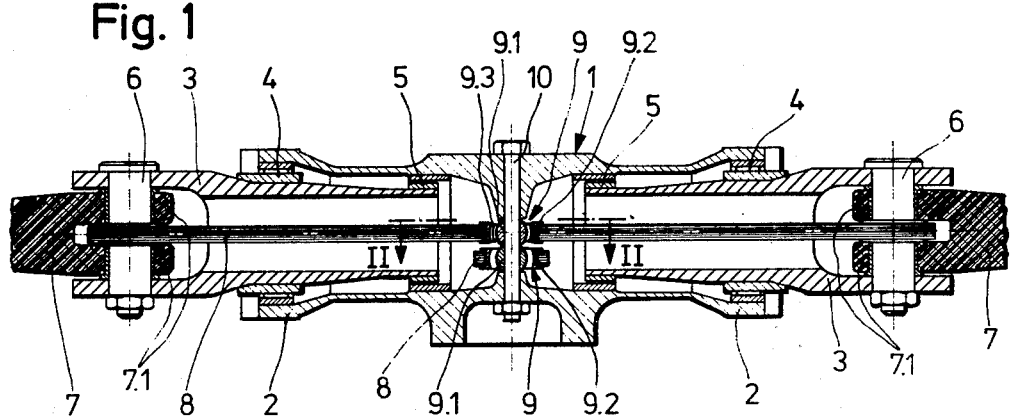
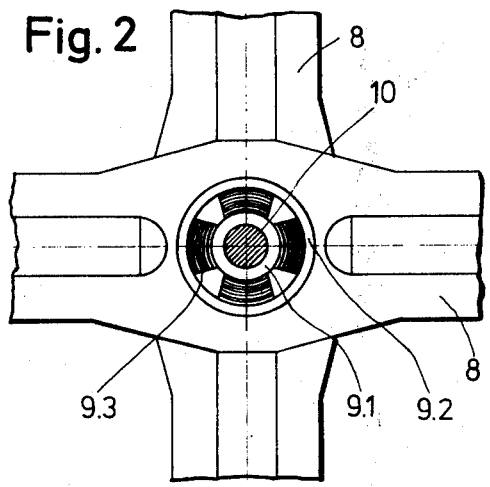
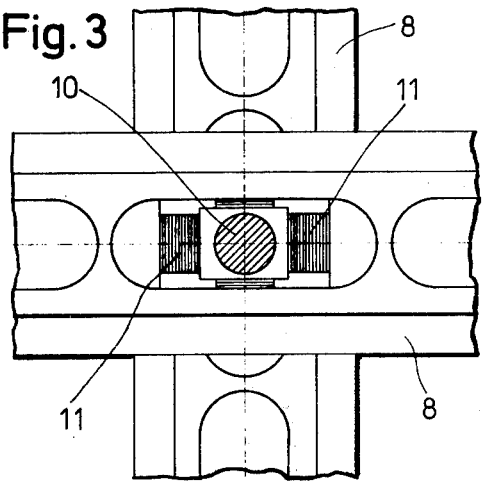
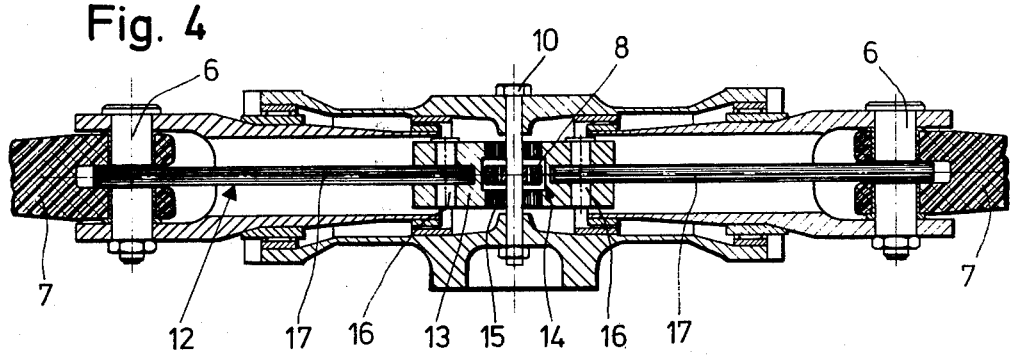

ROTOR FOR A ROTARY WING AIRCRAFT

BACKGROUND OF THE INVENTION

The present invention relates generally to rotary wing aircraft and more particularly to a rotor for such aircraft.

Rotors for use in rotary wing aircraft typically have rotor blades carried at their roots in a rotor head mounted for rotation on the aircraft. Rotors of this kind have connection members attached to the roots of the blades. The connection members are torsionally elastic and usually take the form of a package like collection of tension laminae. The tension laminae of one such package for one pair of rotor blades may be arranged in alternating layers with the laminae of a package for another pair of rotor blades of the same rotor. This layering occurs at the center of the rotor head where the laminae of each package cross over each other. The laminae packages may be centered by means of a pin coaxially arranged relative to the axis of rotation of the rotor. The centrifugal forces which originate in the individual rotor blades about the rotor are therefore counterbalanced at the pin (see for example German DT-PS 15 31 355). When a central support such as a pin is used, however, the laminae package for each rotor blade will twist along its length up to the point of support during each angular movement of the blade. Accordingly, twisting of the tension laminae also occurs at cyclic angular changes of the rotor blades, i.e. in the case of pivot changes of each two diametrically opposed blades in the same direction and by the same amount.

In prior German DT-PS No. 15 31 359, twisting of the laminae in the case of cyclic angular changes of the blades is eliminated in a rotor having only four rotor blades about the rotor by providing endless stretched loops as the tension laminae. The loop connecting one pair of rotor blades is arranged in a vertical plane and the loop connecting the other pair of rotor blades is arranged in a horizontal plane passing through the vertical loop. These loops are arranged so as to pass freely through the center of the rotor head and the dimensions of the loops are chosen such that they will not interfere with each other during cyclic and/or collective angular movements of the rotor blades. When using this type of four-blade rotor, only the collective angular movements of opposite blades will therefore effect twisting of the tension laminae. Thus, torsional stress in the tension laminae can be substantially reduced. In practice, however, it has been found that a central support for each pair of rotor blades about the rotor head is necessary because of imbalances and vibrations which occur in the axial direction of each rotor blade. Therefore, while the above described four-blade rotor may have certain advantages, it has little practical significance.

It is accordingly an object of the present invention to provide a rotor for a rotary wing aircraft which has a central support for each pair of rotor blades about the rotor, but which eliminates the torsional stresses occurring in the torsionally elastic connection member between the rotor blade of a pair of rotors, which result from cyclic angular movements of the rotor blades.

Other objects, features and advantages of the present invention will become more apparent from the description of the invention in connection with the accompanying drawings to be described more fully hereinafter.

SUMMARY OF THE INVENTION

The foregoing object is generally accomplished by providing a torsionally elastic connection member extending between the roots of a pair of rotor blades, which are carried in bearings for angular movement in the rotor head. The connection member is mounted at its longitudinal center in the rotor head for pivotal movement about its longitudinal axis.

Because the torsionally elastic connection member is centered at the rotor head for pivotal movement, preferably by means of a support to which a compressive load can be applied in a longitudinal direction, both blades of the pair of blades can be tilted together with its connection member about the longitudinal axis of the blades when cyclic changes occur in the blades. This is the same advantage which can be achieved in rotors which do not have centering support devices for the pair of rotor blades. Thus, if the rotor blades are controlled, only collective pitch changes will effect torsional stresses in the connection member. Additionally, the arrangement of the present invention simplifies so called lead-lag-damping of the rotor blades my making it possible to use elastomer bearings to support the torsionally elastic connection member at the rotor head. It is well known that the rotor for a rotary wing aircraft tends to vibrate in a direction perpendicular to the axis of rotation of the rotor. Thereof result inplane bending loads and vibrations on the rotor blades. Antimetrically occurring vibrations or lead-lag motion in opposite blades of a pair of blades become stabilized by the use of an elastomer bearing for the torsionally elastic connection member of a second pair of rotor blades positioned at an angle of 90 degrees with respect to the first pair of rotor blades. This is a result of the relatively large mass of the second pair of rotor blades exerting a force against the bearing in a direction of the longitudinal axis of the first set of blades. Thus, the longitudinal force exerted on the blades will tend to stabilize them.

BRIEF DESCRIPTION OF THE DRAWINGS

Embodiments of the invention, along with other features and details thereof will be more fully described in connection with the accompanying drawings, in which:

FIG. 1 is a vertical longitudinal sectional view taken through a central portion of a rotor embodying the present invention;

FIG. 2 is a sectional view taken along lines II—II of FIG. 1 illustrating one embodiment of the present invention;

FIG. 3 is a view similar to that of FIG. 2 illustrating another embodiment of the present invention; and FIG. 4 is a view similar to that of FIG. 1 illustrating an embodiment of the present invention in which the rotor blades are arranged in a single plane.

DESCRIPTION OF THE INVENTION

Referring now in more detail to the accompanying drawings, FIG. 1 illustrates a rotor for use in a rotary wing aircraft having four blades arranged in two pairs. The rotor head 1 has arms in the form of bearing sleeves 2 which extend radially outward from the center of the head. The rotor head is mounted on a rotor shaft (not shown) for rotation with respect to the aircraft. A rotor blade root sleeve 3 is pivotally supported in roller bearings 4 and 5 in each of the bearing sleeves 2. Each rotor blade 7 is carried in the root sleeve 3 and is fixedly secured therein by a pin 6 extending through the sleeve and the root of each blade. Each rotor blade 7 can for example be made from a fiber-reinforced plastic. For this purpose the root of each blade is divided into a pair of webs 7.1. The bending moments as a result of lead-lag and flapping motion acting on each of the rotor blades 7 are transmitted to the rotor head 1 through the blade root sleeves 3 and the roller bearings 4 and 5.

To absorb the centrifugal forces which originate in the rotor blades, the rotor blades which are located opposite to each other forming a pair of blades are connected to each other at their roots by a connection member. Because FIG. 1 is a longitudinal sectional view, only one pair of blades with its connection member is fully illustrated. The connection member for the other pair of blades is seen in section in FIG. 1. A torsionally elastic rod 8 formed of a package like collection of tension laminae thus forms the connection member extending between and connecting the roots of the blades 7 shown in FIG. 1. Rod 8 is connected to the root of each blade 7 between the webs 7.1 by the pin 6. Each rod 8 can be made of any elastic material which has sufficient strength for withstanding prolonged alternating stresses, such as for example fiber-reinforced plastics or spring steel.

Each rod 8 for a pair of blades is longitudinally centered at the center of the rotor head 1 by means of a bearing 9 which can be subjected to compression stresses. Bearing 9 permits rotating or angular movement of the rod about its longitudinal axis. Therefore, the rod is only subjected to torsional stress when the angular movements of the pair of blades produces a collective change. Because of the bearing 9, however, the rod will be able to tilt or pivot together with both rotor blades 7 of the pair during cyclic blade angle changes. To permit the rotating and angular movements of the rod, bearing 9 can be made of a spherical elastomer bearing, such as illustrated in FIGS. 1 and 2. This type of elastomer bearing can be formed by bodies 9.3 made of alternating layers of elastic rubber and metal (or other similar material) positioned in a known manner between an inner ball member 9.1 and an outer ring member 9.2. In the embodiment shown in FIG. 1, the inner ball members 9.1 of the bearings for centrally supporting the rod connection members of the two pairs of rotor blades are positioned one on top of the other on a central pin 10 coaxially aligned with the axis of rotation of the rotor. Accordingly, the two pairs of blades will be located and will rotate in different planes, such as in the rotor shown in German DT-PS 15 31 361. FIG. 2 further illustrates that the rod 8 for the two different pairs of rotor blades are also positioned one above the other.

The positioning of the rotor blades and their corresponding connection members in different planes will only be necessary, however, if the connection members are of the same design. The use of spherical bearings to support the connection member at its longitudinal center is also not required.

FIG. 3 illustrates an embodiment of the invention in which the bearings for the rods 8 which form the connection members are formed by axial bearings 11 which are arranged in the plane of rotation of a pair of rotor blades and which are positioned on opposite sides of the axis of rotation of the rotor (i.e. on opposite sides of central pin 10). Bearings 11 are also preferably formed as elastomer bearings.

Comparing the arrangements of the rods 8 in FIGS. 2 and 3 illustrates that the support or bearings shown in FIG. 3 permits the shape of the rod and of the tension laminae which form the rod to be of a simpler design which can be of benefit in production. Also, the rods illustrated in FIG. 3 will occupy less room in the rotor head because the recesses required in the center of the rods shown in FIG. 2 are no longer necessary. On the other hand, the spherical bearings of FIGS. 1 and 2 will have the advantage of also being able to journal each rod 8 for movement in a direction perpendicular to the plane of rotation of the blades.

Typical joint bearings preferably with teflon or carbon coatings may of course also be used to centrally support the connection members formed by rods 8. The use of elastomer bearings, however, is desirable for swing-stabilization discussed above.

Referring now to FIG. 4, a four blade rotor, consisting of two pairs of rotor blades is shown in which both pairs of rotor blades are arranged for rotation in the same plane without losing the advantage of pivotally supporting the torsionally elastic connection members at their longitudinal center. In this arrangement, connection member 12 of one pair of rotor blades is provided with an inflexible centerpiece 13. Connection member 14 of the other pair of rotor blades extends through the centerpiece 13 at an angle of 90 degrees with respect to connection rod 12. Thus, a connection member can be provided for pairs of blades located for rotation in the same plane without adversely affecting their cyclic motion. Connection member 12 consists of two torsionally elastic rods 17, each of which have one end secured to the centerpiece 13 by connecting pins 16. The other end of each rod 17 is connected to the root of a rotor blade 7 by pins 6. Each rod 17 is also made from a package of tension laminae in a manner previously described. The other torsionally elastic connection member 14 may be formed of a single continuous torsionally elastic rod 8, such as described in connection with FIGS. 1, 2 or 3. The central support for connection member 14 may for example be the axial elastomer bearing such as illustrated in FIG. 3.

Although the present invention has been described and illustrated with respect to a rotor which has a jointless blade support arrangement, the invention can also be applied to rotors of the semi-rigid type which have cardanic suspensions and supports for the rotor blades.

Further, while the invention has been described and illustrated with respect to embodiments which produce satisfactory results, it will be appreciated by those skilled in the art, after understanding the purposes of the invention, that various changes and modifications may be made without departing from the spirit and scope of the invention, and it is therefore intended to cover all such changes and modifications in the appended claims.

What is claimed is:

1. A rotor for a rotary wing aircraft comprising a rotor head having an axis of rotation, an even number of rotor blades arranged in pairs about and extending radially outwardly from said rotor head and extending transversely of the axis of rotation of said rotor head, said rotor blades of each pair being located on diametrically opposite sides of the axis of rotation of said rotor head and each said blade having a root positioned on the radially inner end thereof spaced radially outwardly from the axis of rotation of said rotor head, roller bearings carried by said rotor head pivotally supporting each of said rotor blades, a torsionally elastic connection member extending through said rotor head and between and connecting the roots of a pair of rotor blades, and bearing means supporting said connection member at its longitudinal center in said rotor head concentric to the axis of rotation of said rotor head for providing pivotal movement of said connection member about the longitudinal axis thereof.

2. The rotor according to claim 1 wherein said bearing means for mounting said connection member in said rotor head for pivotal movement comprises a bearing which is compression located in the longitudinal direction of said torsionally elastic connection member.

3. The rotor according to claim 2 wherein said bearing is a spherical bearing coaxially positioned with the axis of rotation of said rotor head.

4. The rotor according to claim 3 wherein said bearing is an elastomer bearing.

* * * * *